United States Patent
Adams, Jr. et al.

(10) Patent No.: US 9,118,842 B2
(45) Date of Patent: Aug. 25, 2015

(54) PRODUCING FOCUSED VIDEOS FROM SINGLE CAPTURED VIDEO

(75) Inventors: James E. Adams, Jr., Rochester, NY (US); John Randall Fredlund, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 207 days.

(21) Appl. No.: 13/220,751

(22) Filed: Aug. 30, 2011

(65) Prior Publication Data

US 2013/0050564 A1    Feb. 28, 2013

(51) Int. Cl.
| | |
|---|---|
| H04N 5/232 | (2006.01) |
| H04N 5/228 | (2006.01) |
| H04N 5/235 | (2006.01) |
| G06T 5/50 | (2006.01) |
| G02B 27/00 | (2006.01) |

(52) U.S. Cl.
CPC .............. *H04N 5/2356* (2013.01); *G06T 5/50* (2013.01); *G02B 27/0075* (2013.01); *G06T 2207/10016* (2013.01); *G06T 2207/10148* (2013.01); *G06T 2207/20144* (2013.01)

(58) Field of Classification Search
None
See application file for complete search history.

(56) References Cited

U.S. PATENT DOCUMENTS

| | | | |
|---|---|---|---|
| 5,282,045 A | 1/1994 | Mimura et al. | |
| 7,859,588 B2 | 12/2010 | Parulski et al. | |
| 8,384,820 B1 * | 2/2013 | Lohier et al. | 348/349 |
| 2004/0080661 A1 | 4/2004 | Afseniu et al. | |
| 2007/0126920 A1 * | 6/2007 | Lee | 348/345 |
| 2010/0091169 A1 * | 4/2010 | Border et al. | 348/345 |
| 2010/0128121 A1 * | 5/2010 | Wilkinson | 348/135 |
| 2010/0128930 A1 | 5/2010 | Liu et al. | |
| 2010/0141802 A1 | 6/2010 | Knight et al. | |
| 2010/0265346 A1 * | 10/2010 | Iizuka | 348/218.1 |
| 2010/0271498 A1 * | 10/2010 | Hwang et al. | 348/222.1 |
| 2011/0310279 A1 * | 12/2011 | Enge et al. | 348/294 |
| 2012/0147197 A1 * | 6/2012 | Hjelmstr m et al. | 348/187 |
| 2012/0218459 A1 * | 8/2012 | Tsujino et al. | 348/345 |
| 2012/0294590 A1 * | 11/2012 | Pitts et al. | 386/282 |
| 2013/0050542 A1 * | 2/2013 | Asukabe et al. | 348/241 |

FOREIGN PATENT DOCUMENTS

WO    2010/124070    10/2010

OTHER PUBLICATIONS

International Preliminary Report on Patentability for PCT/US2012/051646, issued Mar. 4, 2014.

* cited by examiner

*Primary Examiner* — Lin Ye
*Assistant Examiner* — John H Morehead, III

(57) ABSTRACT

A method of providing an all-in-focus video from a single captured video is disclosed. The method uses a processor to perform the steps of acquiring a single captured video of a scene such that during capture there are at least two differing focus settings by using the single captured video to provide a plurality of videos having at least a first video at the first focus setting and a second video at the second focus setting and providing an all-in-focus video from the plurality of videos.

17 Claims, 8 Drawing Sheets

PRODUCING FOCUSED VIDEOS FROM SINGLE CAPTURED VIDEO

CROSS REFERENCE TO RELATED APPLICATION

The present application is related to commonly-assigned U.S. patent application Ser. No. 12/883,261, filed Sep. 16, 2010, entitled "Refocusing Images Using Scene Captured Images" by James E. Adams, Jr., the disclosure of which is incorporated herein.

FIELD OF THE INVENTION

The present invention relates to forming a refocused video from a video with differing focus settings.

BACKGROUND OF THE INVENTION

In order to produce a video with a perceived high level of image quality, it is essential that the scene elements of interest be in focus. Under carefully controlled video capture conditions, it is possible to take the time to properly compose and light the scene and to adjust the capture lens in a way to ensure the desired elements of the scene are in focus. Frequently, however, the capture conditions cannot be controlled in this manner, e.g., sports and wildlife videography. In this latter case, a well-known strategy is to capture the scene using multiple focus settings with the assumption that the video corresponding to one of the focus settings will have the desired scene elements in focus. One common approach is to use a camera with multiple capture lens and multiple image sensors, as in commonly-assigned U.S. Pat. No. 7,859,588 to Parulski et al. This approach has the disadvantage of doubling the number of expensive components in the camera (lens and sensor) and correspondingly increasing the size and complexity of the capture device. Another approach is to segment the optical field and image sensor into separate focus zones using an array of microlenses inserted into the optical path as in U.S. Patent Application 2010/0141802 to Knight et al. The disadvantage of this approach is the loss in the image resolution due to the segmentation of the image sensor. A third approach is to rapidly change the focus of the capture lens around the nominal focus position determined by the camera and to evaluate if a better focus position is achieved during the rapid focus change. If a better focus position is found, it becomes the new nominal focus position and the process is repeated until the focus position stabilizes, as in commonly-assigned U.S. Patent Application 2010/0091169 to Border et al. The disadvantage of this approach is that multiple focus position image information is not retained thereby preventing the ability to change the effective focus of the video after capture. Finally, in all these approaches, the depth of field of the resulting video is limited by the f-number and focal length of the capture lens and the camera to subject distance.

What is needed is a way to produce a video with all scene objects in focus regardless of camera lens settings or subject distances, using a camera with only one capture lens and one image sensor that permits the scene to be captured at the full resolution of the image sensor.

SUMMARY OF INVENTION

The present invention provides a more effective way of providing an all-in-focus video from a captured video. In accordance with the invention, there is provided a method of providing at least two videos from a single captured video of a scene, comprising using a processor to perform the steps of:

(a) acquiring a single captured video of a scene such that during capture there are at least two differing focus settings; and (b) using the single captured video to provide a plurality of videos having at least a first video at the first focus setting and a second video at the second focus setting.

An advantage of the present invention is producing an all-in-focus video in which all elements in the scene are in focus.

An additional advantage of the present invention is providing an all-in-focus video without requiring the use of higher f-number lens (e.g., f/16 or higher), permitting the use of lower f-number lenses in order to reduce the noise in the resulting all-in-focus video.

An additional advantage of the present invention is the simplicity of the associated calculations resulting in reduced computation resource requirements and execution time.

An additional advantage of the present invention is the ability to process stationary scene elements differently from moving scene elements.

An additional advantage of the present invention is the use of a video camera with a single lens and a single sensor for capturing a single video stream with multiple focus settings.

DETAILED DESCRIPTION

Figure 1:
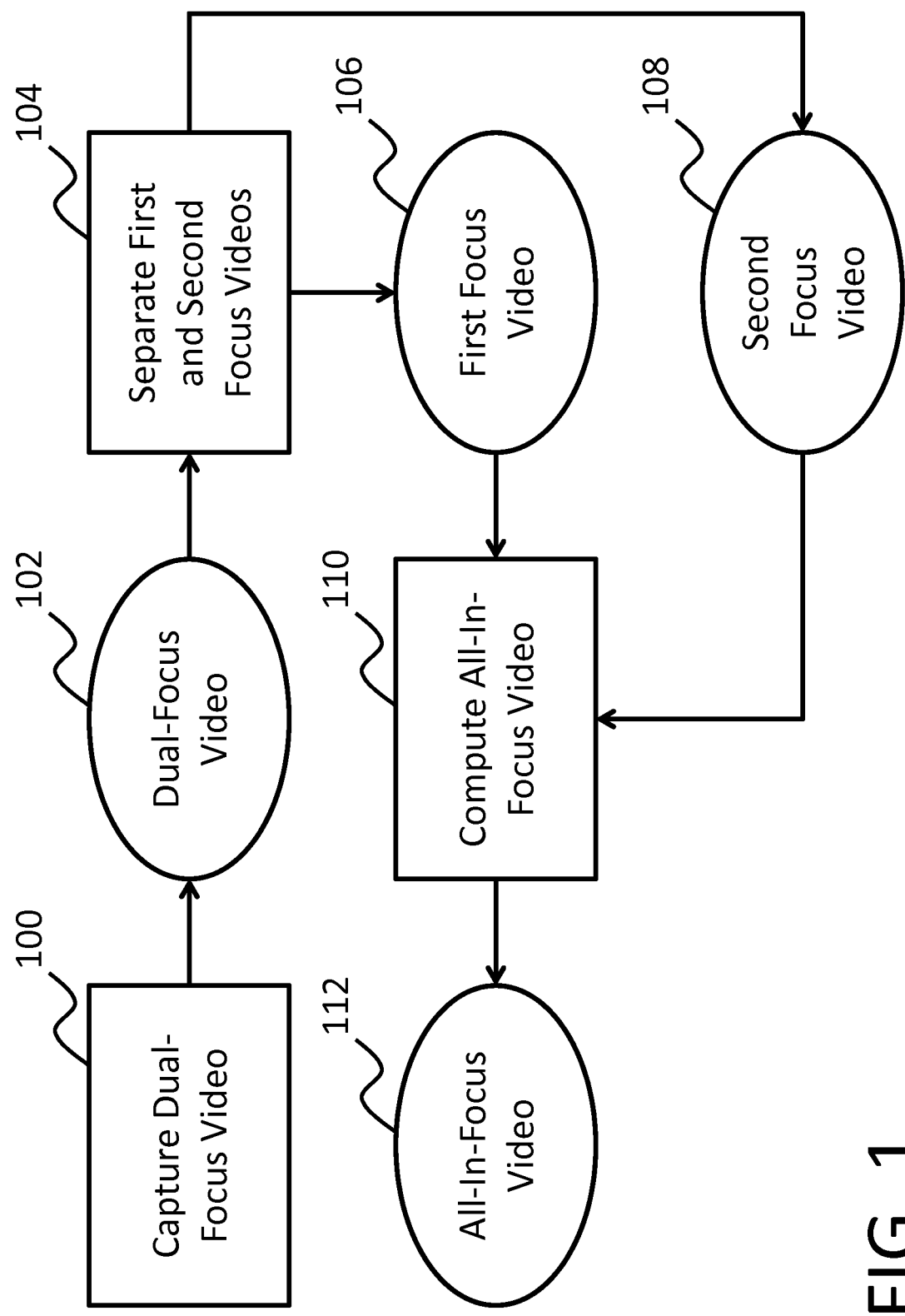
FIG. 1 is a block diagram of the preferred embodiment of the present invention.

FIG. 1 is a flowchart of the preferred embodiment of the present invention. A capture dual-focus video block 100 produces a dual-focus video 102. The dual-focus video 102 is a single captured video of the scene in which some percentage of the video frames are captured with a first focus setting of the capture dual-focus video block 100 and a complimentary percentage of the video frames are captured with a second focus setting of the capture dual-focus video block 100. As an example only 50 percent of the video frames are captured with a first focus setting and 50 percent of the video frames are captured at a second focus setting. A separate first and second focus videos block 104 produces a first focus video 106 and a second focus video 108 from the dual-focus video 102. A compute all-in-focus video block 110 produces an all-in-focus video 112 from the first focus video 106 and the second focus video 108. The first focus video 106 will have some scene elements in focus and other scene elements out of focus depending on the first focus setting and the distances of the scene elements from the capture video camera within the capture dual-focus video block 100. The second focus video 108 will generally have different scene elements in focus and different scene elements out of focus than the first focus video 106. The all-in-focus video 112 will have in focus both the scene elements in focus in the first focus video 106 and the scene elements in focus in the second focus video 108. Assuming all scene elements are in focus in either the first focus video 106 or the second focus video 108, all scene elements in the all-in-focus video 112 will be in focus. In practice, all scene elements may not be in focus in either the first focus video 106 or the second focus video 108, but the invention provides video 112 that is superior in focus to either first focus video 106 or second focus video 108. It is noted that should a scene element change its focus position during the capture of the dual-focus video 102 so that it is in focus for some of the frames of the first focus video 106 and in focus for other frames of the second focus video 108 that the present invention will correctly identify the frames with the scene element in focus regardless of which video has the frame with the scene element in focus.

Figure 2A:
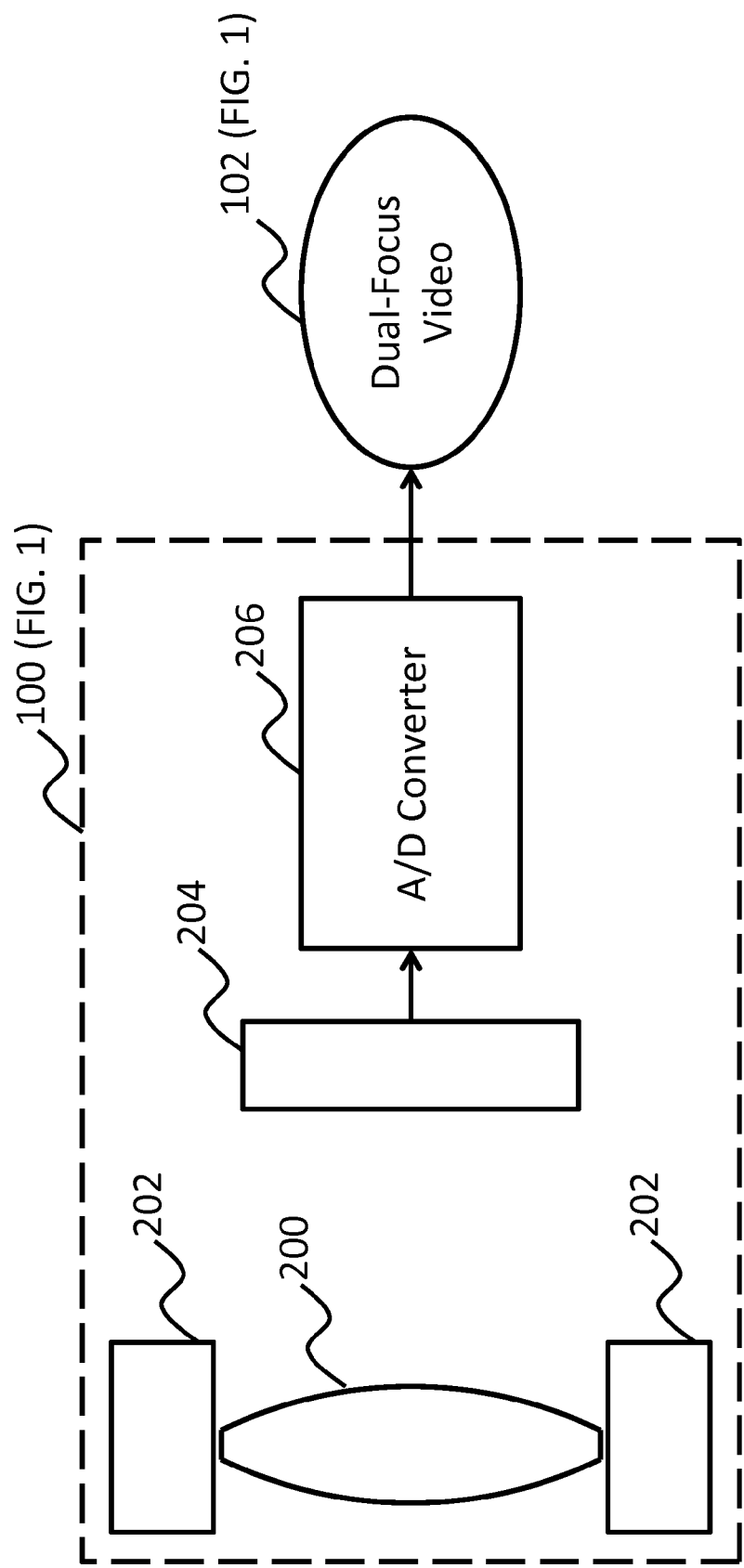
FIGS. 2A and 2B are block diagrams showing detailed views of different image capture systems in accordance with the present invention.

FIG. 2A is a detailed figure of the capture dual-focus video block 100 (FIG. 1). A capture lens 200 images the scene onto a video sensor 204 that includes an array of light-sensitive pixels. A lens mount 202 holds the capture lens 200 and moves one or more of the lens elements in the capture lens 200 in order to alternate between a first focus setting and second focus setting as the dual-focus video 102 (FIG. 1) is being produced. Other elements (not shown) such as an aperture can be provided but are omitted for the sake of clarity. Each video frame in the dual-focus video 102 will be imaged with either the first focus setting or the second focus setting in an alternating manner. The A/D converter 206 converts the analog signal from the video sensor 204 to a digital signal that is stored as the dual-focus video 102 (FIG. 1).

Figure 2B:
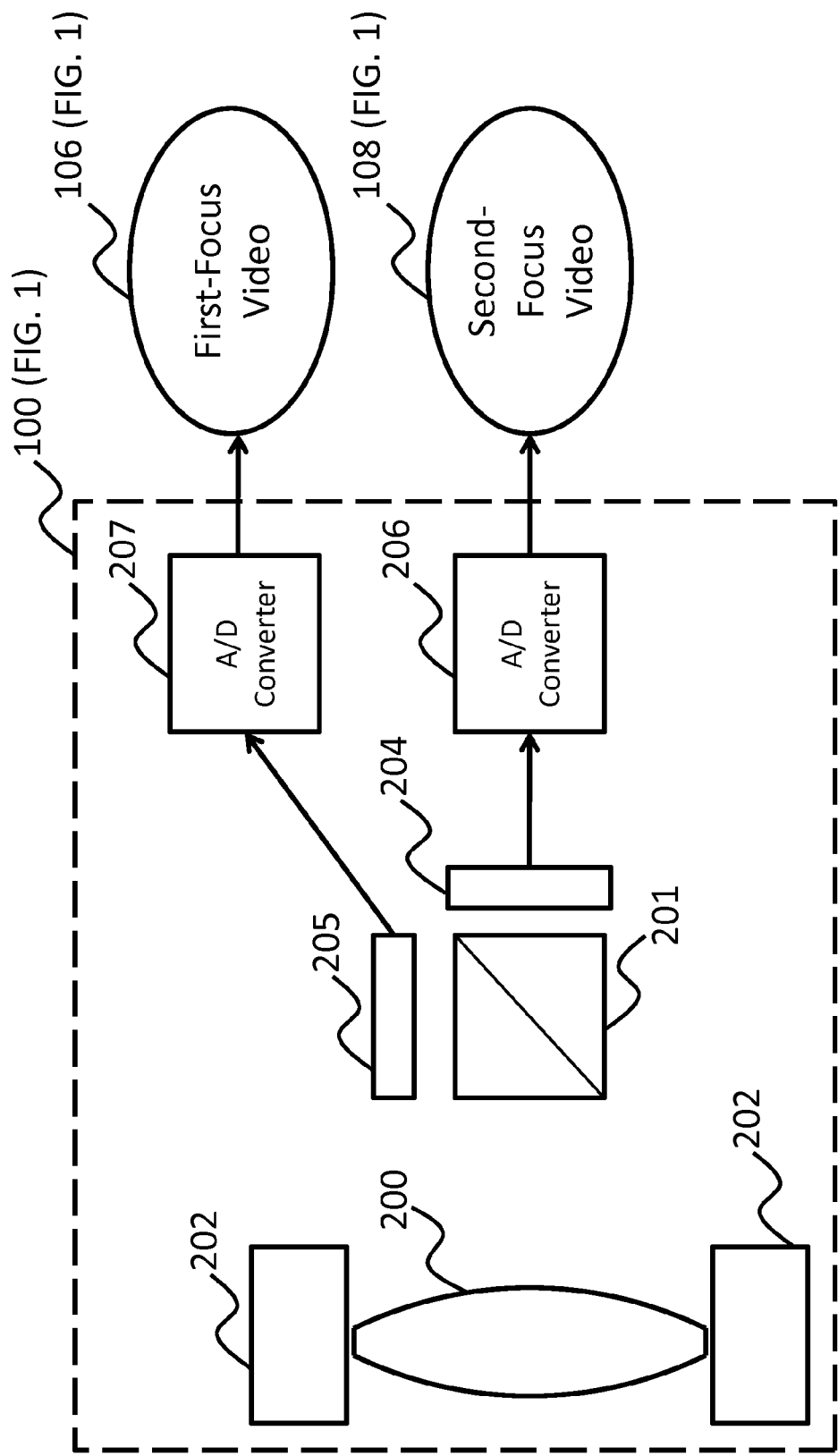

Note that FIG. 2A shows a preferred example with a single sensor. The invention can also be practiced with an image capture system that uses the multiple sensors 204 and 205, multiple A/D converters 206 and 207, and a beam splitter 201 as shown in FIG. 2B. The optical path and focus for sensor 205 is different from that of sensor 204, thus providing a first focus video 106 and a second focus video 108 via different sensors 204, 205. This configuration eliminates the need for the time variant focus of the single sensor system. The plurality of sensors 204, 205 can be in a fixed relationship with regard to focus, or one or both can have the ability to be adjusted. In one preferred embodiment, sensors 204 and 205 are panchromatic, while a third sensor (not shown) provides chrominance information. Because the plurality of sensors 204, 205 will not be matched in focus, construction of the optical system is simplified from traditional multiple sensor and beam splitter cameras. The difference in focus between sensors 204, 205 can be measured and taken into account when computing all-in-focus video.

There are many ways to vary focus from frame to frame. An optical element such as a diopter can be moved in and out of the optical path. The position of any element or combination of elements including the lens may be varied to achieve different focus for successive frames of video. Alternatively, the shape of a flexible optical element can be varied in a known manner to provide differing focal lengths. Also, the position of the sensor may be varied to achieve a similar effect. It is preferred to minimize the time needed to achieve the different focus positions so that the bulk of the time spent capturing a frame is available for the sensor to integrate light while stationary.

Figure 3:
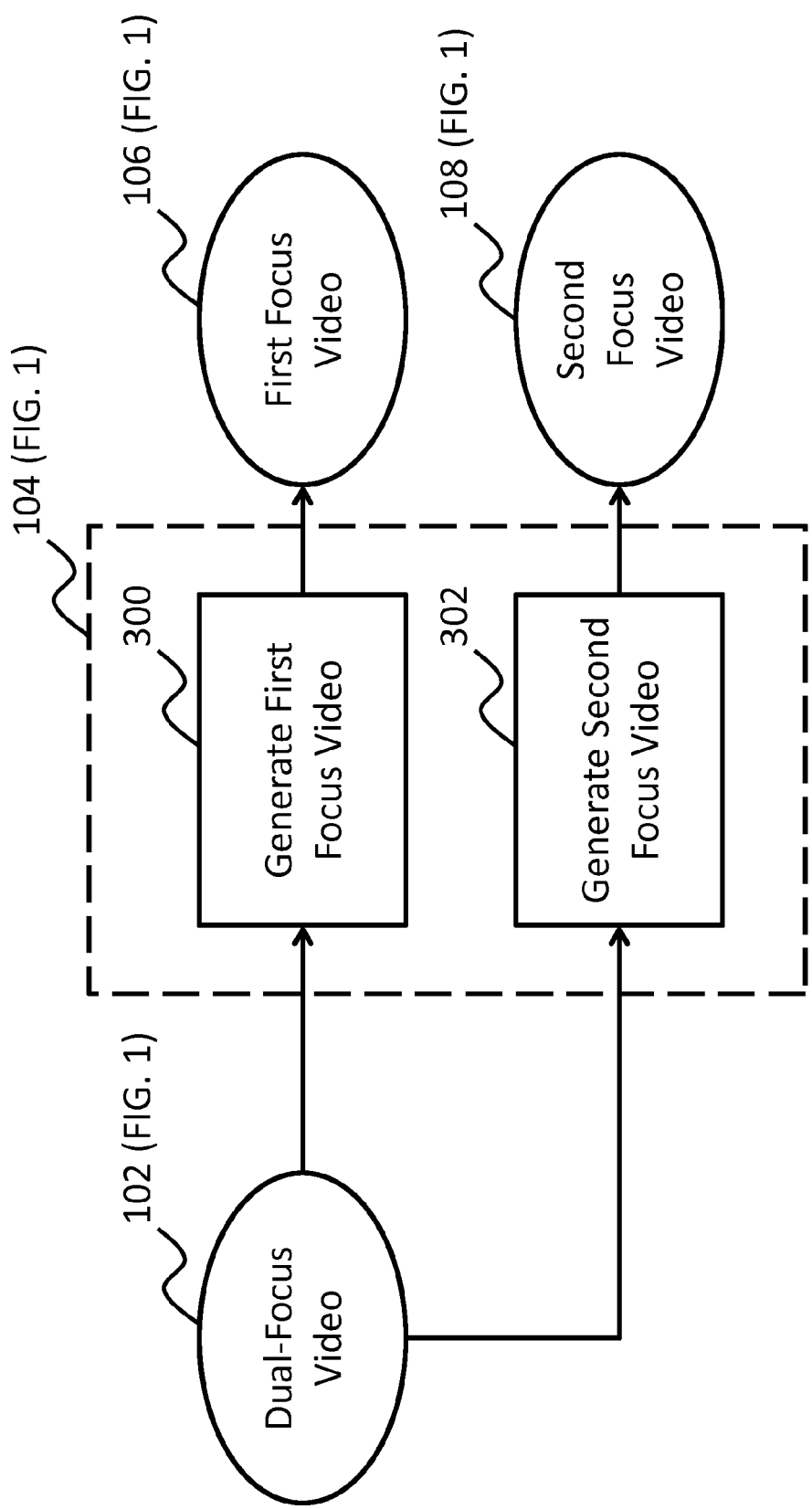
FIG. 3 is a block diagram showing a detailed view of the separate first and second focus videos block for a preferred embodiment of the present invention.

FIG. 3 is a detailed figure of the separate first and second focus videos block 104 (FIG. 1). A generate first focus video block 300 produces the first focus video 106 (FIG. 1) from the dual-focus video 102 (FIG. 1). A generate second focus video block 302 produces the second focus video 108 (FIG. 1) from the dual-focus video 102 (FIG. 1).

Figure 4:
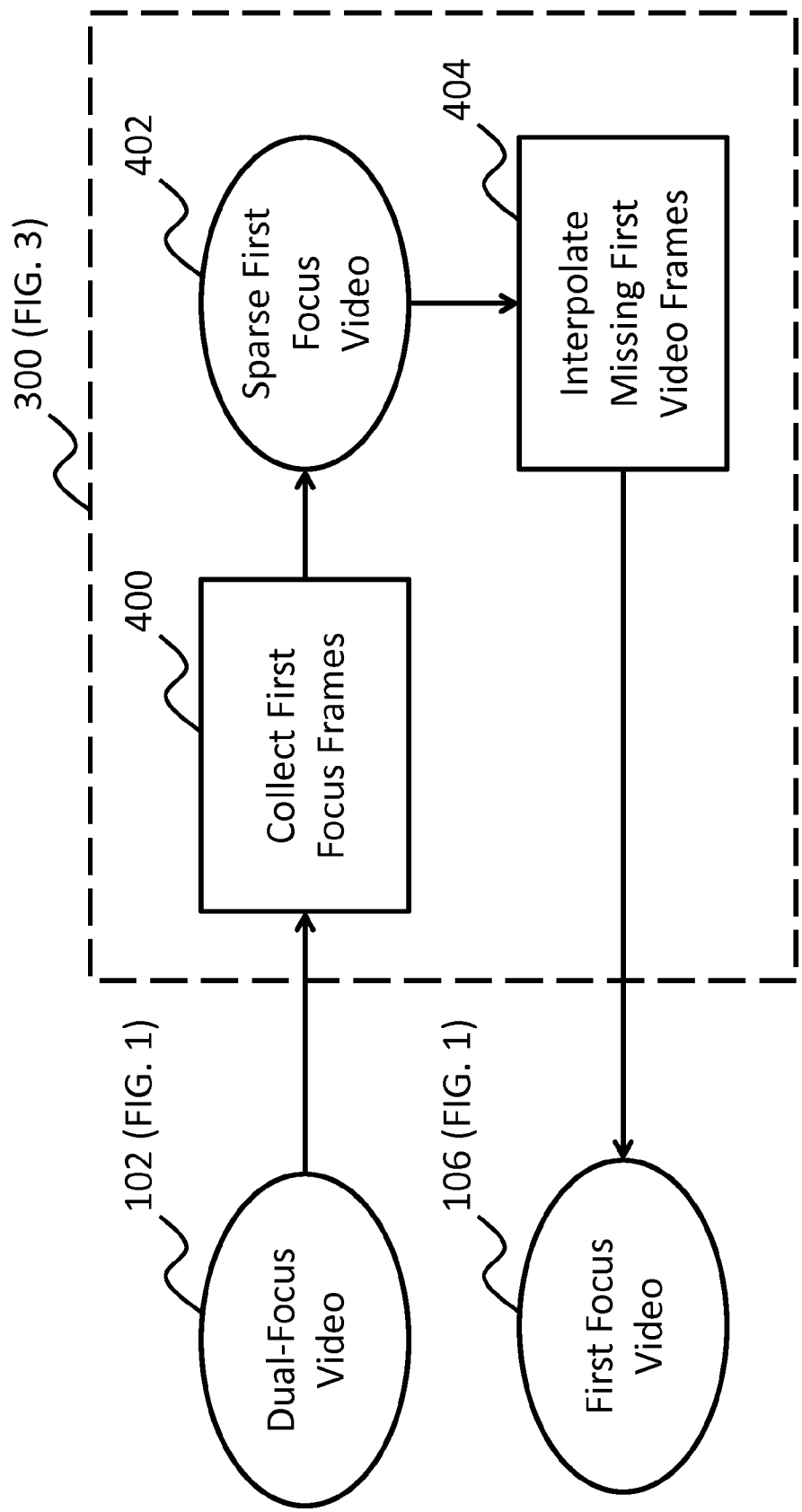
FIG. 4 is a block diagram showing a detailed view of the generate first focus video block for a preferred embodiment of the present invention.

FIG. 4 is a detailed figure of the generate first focus video block 300 (FIG. 3). A collect first focus frames block 400 produces a sparse first focus video 402 from the dual-focus video 102 (FIG. 1). The sparse first focus video 402 contains captured video frames corresponding to the first focus setting and blank video frames corresponding to the second focus setting. An interpolate missing first video frames block 404 produces the first focus video 106 (FIG. 1) from the sparse first focus video 402. The interpolate missing first video frames block 404 replaces the blank frames in the sparse first focus video 402 with interpolated frames from the neighboring captured video frames. Suitable interpolation methods for use in the interpolate missing first video frames block 404 will be well known to those skilled in the art.

Figure 5:
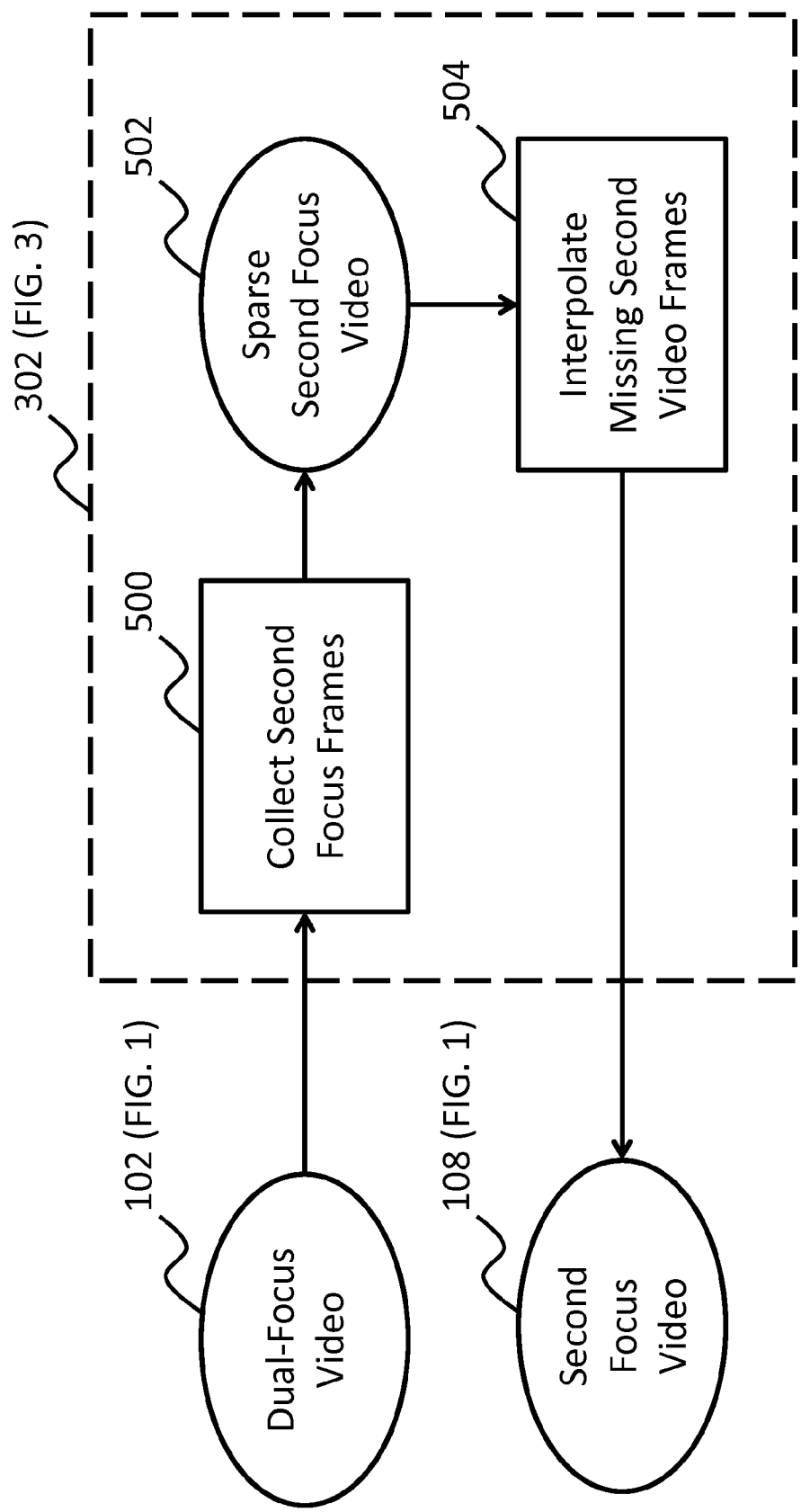
FIG. 5 is a block diagram showing a detailed view of the generate second focus video block for a preferred embodiment of the present invention.

FIG. 5 is a detailed figure of the generate second focus video block 302 (FIG. 3). A collect second focus frames block 500 produces a sparse second focus video 502 from the dual-focus video 102 (FIG. 1). The sparse second focus video 502 contains captured video frames corresponding to the second focus setting and blank video frames corresponding to the first focus setting. An interpolate missing second video frames block 504 produces the second focus video 108 (FIG. 1) from the sparse second focus video 502. The interpolate missing second video frames block 504 replaces the blank frames in the sparse second focus video 502 with interpolated frames from the neighboring captured video frames. Suitable interpolation methods for use in the interpolate missing second video frames block 504 will be well known to those skilled in the art.

Figure 6:
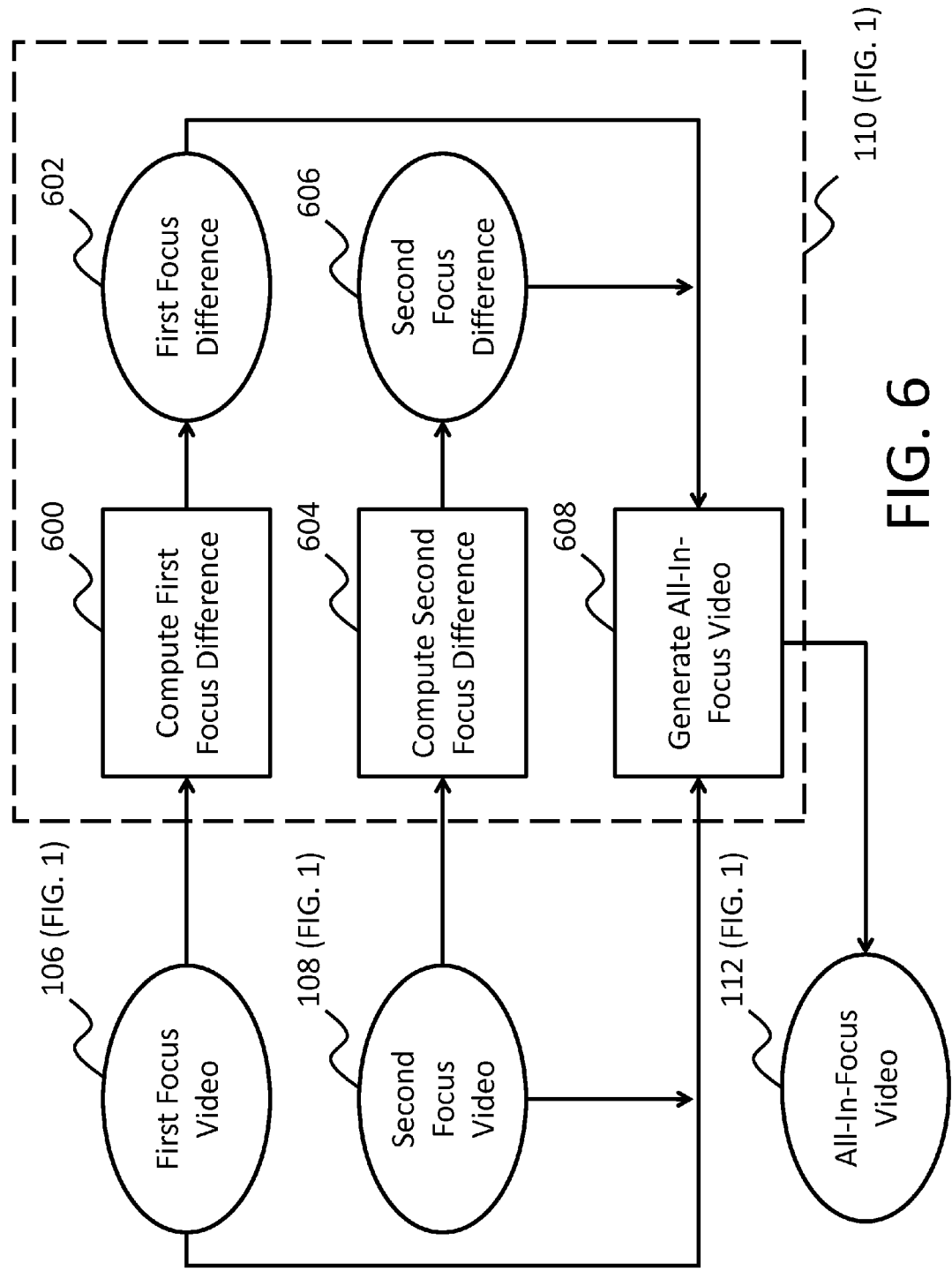
FIG. 6 is a block diagram showing a detailed view of the compute all-in-focus video block for a preferred embodiment of the present invention.

FIG. 6 is a detailed figure of the compute all-in-focus video block 110 (FIG. 1) for the preferred embodiment. A compute first focus difference block 600 produces a first focus difference 602 from the first focus video 106 (FIG. 1). A compute second focus difference block 604 produces a second focus difference 606 from the second focus video 108 (FIG. 1). A generate all-in-focus video block 608 produces the all-in-focus video 112 (FIG. 1) from the first focus video 106 (FIG. 1), second focus video 108 (FIG. 1), first focus difference 602, and the second focus difference 606.

In FIG. 6, for each pixel location in the image, the compute first focus difference block 600 computes a difference between the current first focus video frame 106 (FIG. 1) and a previous frame in the first focus video 106 (FIG. 1). This difference is computed by subtracting the pixel value of the previous frame from the pixel value of the current first focus video frame 106 (FIG. 1) at each pixel location within the frame. The differences taken together produce a video frame of differences. The resulting differences become the first focus difference 602. In regions of the image that are not in motion or otherwise changing between frames will be zero in the first focus difference 602. In the other regions of the image, the first focus difference 602 will be nonzero. For each pixel location in the image, the compute second focus difference block 604 computes a difference between the current second focus video frame 108 (FIG. 1) and a previous frame in the second focus video 108 (FIG. 1). The resulting differences become the second focus difference 606. In regions of the image that are not in motion or otherwise changing between frames will be zero in the second focus difference 606. In the other regions of the image, the second focus difference 606 will be nonzero. It is noted that if the video camera pans or zooms during the video capture, a form of motion will be imparted to the entire scene. In this case, the first focus difference 602 and the second focus difference 606 will generally not be zero for the regions of the image that are not in motion or otherwise changing. The present invention will still produce the desired results provided the effects of the panning or zooming are not too great.

In FIG. 6, in a preferred embodiment, for each pixel location in the image, the generate all-in-focus video block 608 compares the first focus difference 602 to a high first focus threshold and a low first focus threshold. If the first focus difference 602 is greater than the high first focus threshold or lower than the low first focus threshold, then the first focus video 106 (FIG. 1) value is selected as the all-in-focus video 112 (FIG. 1) value for that pixel location. Otherwise, the second focus video 108 (FIG. 1) value is selected as the all-in-focus video 112 (FIG. 1) value. In an alternate embodiment of the present invention, for each pixel location in the image, the generate all-in-focus video block 608 compares the second focus difference 606 to a high second focus threshold and a low second focus threshold. If the second focus difference 606 is greater than the high second focus threshold or lower than the low second focus threshold, then the second focus video 108 (FIG. 1) value is selected as the all-in-focus video 112 (FIG. 1) value for that pixel location. Otherwise, the first focus video 106 (FIG. 1) value is selected as the all-in-focus video 112 (FIG. 1) value. In an additional alternate embodiment of the present invention, for each pixel location in the image, the generate all-in-focus video block 608 compares the first focus difference 602 to a high first focus threshold and a low first focus threshold and the second focus difference 606 to a high second focus threshold and a low second focus threshold. If the first focus difference 602 is greater than the high first focus threshold or lower than the low first focus threshold and the second focus difference 606 is less than or equal to the high second focus threshold and greater than or equal to the low second focus threshold, then the first focus video 106 (FIG. 1) value is selected as the all-in-focus video 112 (FIG. 1) value for that pixel location. Otherwise, the second focus video 108 (FIG. 1) value is selected as the all-in-focus video 112 (FIG. 1) value.

Figure 7:
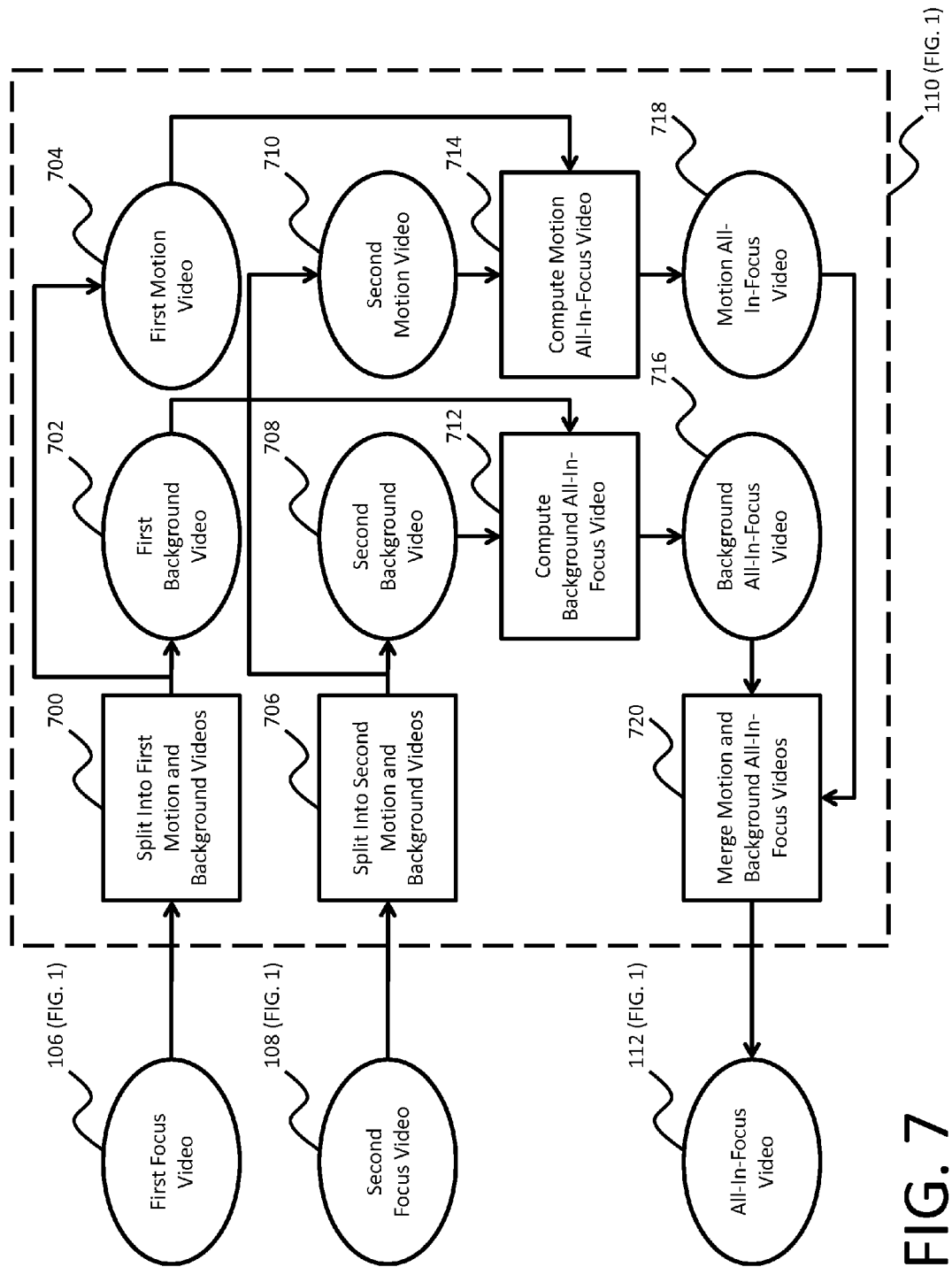
FIG. 7 is a block diagram showing a detailed view of the compute all-in-focus video block for an alternate embodiment of the present invention.

FIG. 7 is a detailed figure of an alternate embodiment of the compute all-in-focus video block 110 (FIG. 1). A split into first motion and background videos block 700 produces a first background video 702 and a first motion video 704 from the first focus video 106 (FIG. 1). A split into second motion and background videos block 706 produces a second background video 708 and a second motion video 710 from the second focus video 108 (FIG. 1). A compute background all-in-focus video block 712 produces a background all-in-focus video 716 from the first background video 702 and the second background video 708. A compute motion all-in-focus video block 714 produces a motion all-in-focus video 718 from the first motion video 704 and the second motion video 710. A merge motion and background all-in-focus videos block 720 produces the all-in-focus video 112 (FIG. 1) from the background all-in-focus video 716 and the motion all-in-focus video 718.

In FIG. 7, the split into first motion and background videos block 700 selects a plurality of video frames, which for a preferred embodiment is five video frames from the first focus video 106 (FIG. 1), and computes the median value at each pixel location across the five video frames. The resulting median values become a video frame of the stationary background scene elements. This video frame in turn becomes the first background video 702 (which only has one frame). The first background video 702 is subtracted from each frame in the first focus video 106 (FIG. 1) to produce the frames of the first motion video 704. A special pixel value is used in the first motion video 704 to denote the locations of the stationary background scene elements. The split second motion and background videos block 706 is identical to the split into first motion and background videos block 700 except that the second focus video 108 (FIG. 1) is split into the second background video 708 and the second motion video 710.

In FIG. 7, the compute background all-in-focus video 712 begins by producing a blurred first background video by convolving the first background video 702 with a simple low-pass filter such as the following well-known kernel:

$$\frac{1}{16}\begin{pmatrix} 1 & 2 & 1 \\ 2 & 4 & 2 \\ 1 & 2 & 1 \end{pmatrix}$$

At each pixel location, the first background video 702 and the second background video 708 are compared to the blurred first background video. The pixel value that has the largest absolute difference with the corresponding blurred first background video pixel value becomes the resulting pixel value of the background all-in-focus video 716.

In FIG. 7, the compute motion all-in-focus video 714 is identical to the compute all-in-focus video 110 (FIG. 1) except that first motion video 704 and second motion video 710 are combined to produce the motion all-in-focus video 718. If at a given pixel location at least one of the pixel values in the first motion video 704 and the second motion video 710 is the special pixel value used to denote the locations of the stationary background scene elements, the corresponding pixel value in the motion all-in-focus video 718 is set to the special pixel value.

In FIG. 7, the merge motion and background all-in-focus videos 720 replaces the special pixel values denoting the locations of the stationary background scene elements in the motion all-in-focus video 718 with the corresponding pixel values from the background all-in-focus video 716. The resulting video becomes the all-in-focus video 112 (FIG. 1).

The invention has been described in detail with particular reference to certain preferred embodiments thereof, but it will be understood that variations and modifications can be effected within the spirit and scope of the invention.

PARTS LIST 100 capture dual-focus video block
102 dual-focus video
104 separate first and second focus videos block
106 first focus video
108 second focus video
110 compute all-in-focus video block
112 all-in-focus video
200 capture lens
201 beam splitter
202 lens mount
204 sensor
205 sensor
206 A/D converter
207 A/D converter
300 generate first focus video block
302 generate second focus video block 400 collect first focus frames block
402 sparse first focus video
404 interpolate missing first video frames block
500 collect second focus frames block
502 sparse second focus video
504 interpolate missing second video frames block
600 compute first focus difference block
602 first focus difference
604 compute second focus difference
606 second focus difference
608 generate all-in-focus video block
700 split into first motion and background videos block
702 first background video
704 first motion video
706 split into second motion and background videos block
708 second background video
710 second motion video
712 compute background all-in-focus video block
714 compute motion all-in-focus video block
716 background all-in-focus video
718 motion all-in-focus video
720 merge motion and background all-in-focus videos block

The invention claimed is:

1. A method of providing video, the method comprising:
   a processor acquiring a single captured video of a scene via a first image sensor and a second image sensor, wherein a first set of frames of the single captured video are captured in a first focus setting by a capture lens onto the first image sensor, and wherein a second set of frames of the single captured video are captured in a second focus setting by the capture lens onto the second image sensor;
   the processor splitting the single captured video to provide a plurality of videos including a first focus video that includes the first set of frames at the first focus setting and a second focus video that includes the second set of frames at the second focus setting, wherein splitting the single captured video comprises:
   producing the first focus video from the first set of frames at the first focus setting and first additional frames produced by interpolation of the first set of frames at the first focus setting, and
   producing the second focus video from the second set of frames at the second focus setting and second additional frames produced by interpolation of the second set of frames at the second focus setting; and
   the processor combining in-focus scene elements from each of the plurality of videos to provide a combined video.

2. The method of claim 1, wherein providing the combined video comprises:
   calculating first focus differences between successive frames in the first focus video; and
   calculating second focus differences between successive frames in the second focus video.

3. The method claim 2, wherein providing the combined video comprises:
   comparing the first focus differences or second focus differences to at least one threshold focus difference; and
   determining whether portions of the combined video should be taken from the first focus video or from the second focus based on the comparison.

4. A method of providing video, the method comprising:
   a processor acquiring a single captured video of a scene via a first image sensor and a second image sensor, wherein a first set of frames of the single captured video are captured with a first focus setting by a capture lens onto the first image sensor, and wherein a second set of frames of the single captured video are captured with a second focus setting by the capture lens onto the second image sensor;
   the processor using the single captured video to provide a plurality of videos including a first focus video that includes the first set of frames at the first focus setting and a second focus video that includes the second set of frames at the second focus setting, wherein providing the plurality of videos comprises:
   producing the first focus video from the first set of frames at the first focus setting and first additional frames produced by interpolation of the first set of frames at the first focus setting, and
   producing the second focus video from the second set of frames at the second focus setting and second additional frames produced by interpolation of the second set of frames at the second focus setting;
   the processor splitting the first focus video into a first background video and a first motion video and the second focus video into a second background video and a second motion video;
   the processor producing a combined background video from the first background video and the second background video;
   the processor producing a combined motion video from the first motion video and the second motion video; and
   the processor producing an overall combined video by combining in-focus elements of the combined background video with in-focus elements of the combined motion video.

5. The method of claim 4, wherein using the single captured video to provide a plurality of videos comprises:
   producing the first focus video from the first set of frames with the first focus setting and first additional frames produced by interpolation of the first set of frames at the first focus position, and
   producing the second focus video from the second set of frames with the second focus setting and second additional frames produced by interpolation of the second set of frames at the second focus position.

6. The method of claim 4, wherein producing a combined motion video comprises:
   calculating first focus differences between successive frames in the first motion video; and
   calculating second focus differences between successive frames in the second motion video.

7. The method of claim 4, wherein producing a combined motion video comprises:
   comparing the first focus differences or the second focus differences to at least one threshold focus difference; and
   determining whether portions of the overall combined video should be taken from the first focus video or from the second focus video based on the comparison.

8. A system comprising:
   a capture lens;
   a first image sensor;
   a second image sensor; and
   a processor configured to:
   acquire a single captured video of a scene via the first image sensor and the second image sensor, wherein a first set of frames of the single captured video are captured with a first focus setting by the capture lens onto the first image sensor, and wherein a second set of frames of the single captured video are captured with a second focus setting by the capture lens onto the second image sensor;

split the single captured video to provide a plurality of videos including a first focus video that includes the first set of frames at the first focus setting and a second focus video that includes the second set of frames at the second focus setting, wherein splitting the single captured video comprises:
producing the first focus video from the first set of frames at the first focus setting and first additional frames produced by interpolation of the first set of frames at the first focus setting, and
producing the second focus video from the second set of frames at the second focus setting and second additional frames produced by interpolation of the second set of frames at the second focus setting; and
combine in-focus scene elements from each of the plurality of videos to provide a combined video.

9. The system of claim 8, wherein the capture lens is configured to alternate between the first focus setting and the second focus setting.

10. A non-transitory computer-readable medium having stored thereon instructions executable by a processor to cause the processor to:
acquire a single captured video of a scene via a first image sensor and a second image sensor, wherein a first set of frames of the single captured video are captured with a first focus setting by a capture lens onto the first image sensor, and wherein a second set of frames of the single captured video are captured with a second focus setting by the capture lens onto the second image sensor;
split the single captured video to provide a plurality of videos including a first focus video that includes the first set of frames at the first focus setting and a second focus video that includes the second set of frames at the second focus setting, wherein the instructions to split the single captured video include instructions to cause the processor to:
produce the first focus video from the first set of frames at the first focus setting and first additional frames produced by interpolation of the first set of frames at the first focus setting, and
produce the second focus video from the second set of frames at the second focus setting and second additional frames produced by interpolation of the second set of frames at the second focus setting; and
combine in-focus scene elements from each of the plurality of videos to provide a combined video.

11. The computer-readable medium of claim 10, wherein the instructions are further executable by the processor to cause a capture lens to alternate between the first focus setting and the second focus setting.

12. The method of claim 1, further comprising alternating the capture lens between the first focus setting and the second focus setting.

13. The method of claim 1, wherein the combined video is substantially an all-focus-video.

14. The method of claim 1, wherein successive frames of the single captured video alternate between the first focus setting and the second focus setting.

15. The method of claim 4, further comprising alternating the captured lens between the first focus setting and the second focus setting.

16. The method of claim 4, wherein the combined video is substantially an all-focus-video.

17. The method of claim 4, wherein the background combined video is substantially an all-focus video, and wherein the motion all-focus-video is substantially an all-focus-video.

* * * * *